United States Patent [19]
Gordon

[11] 3,802,603
[45] Apr. 9, 1974

[54] AUTOMATIC BAR LOADER OR FEEDER
[75] Inventor: Ralph R. Gordon, La Canada, Calif.
[73] Assignee: Blake Rivet Company, South Gate, Calif.
[22] Filed: Dec. 27, 1971
[21] Appl. No.: 211,863

[52] U.S. Cl............. 221/251, 82/2.7, 198/43, 214/1 P, 226/188
[51] Int. Cl............................................. B65h 5/00
[58] Field of Search............ 214/1 P; 226/143, 176, 226/154, 188; 214/1.2, 1.4, 338, 1 PB; 198/43, 52; 221/295, 251, 277; 82/2.5, 2.7

[56] References Cited
UNITED STATES PATENTS

| 3,010,605 | 11/1961 | Jones, Jr. | 221/251 X |
| 2,571,795 | 10/1951 | Tyler et al. | 226/157 X |
| 2,763,236 | 9/1956 | Cummings | 214/1 PB X |
| 3,447,694 | 6/1969 | Hartle | 214/1.2 |
| 3,527,126 | 9/1970 | Jones, Jr. | 226/176 X |

Primary Examiner—Frank E. Werner
Attorney, Agent, or Firm—Herzig & Walsh

[57] ABSTRACT

Apparatus for positioning individual, elongated bar elements to be automatically fed or loaded on an automatic machine such as an automatic bar cutoff machine. The apparatus individually positions elongated bars for delivery for loading to the automatic cutoff machine. Clamping and drive means in the form of grooved pulleys are arranged to clamp an individual bar, one pulley being driven to drive the elongated bar and deliver it to the automatic cutoff machine to a predetermined position. The drive pulley is then reversed. The drive of the drive pulley is by way of cables wrapped around drums with tensioning means to constantly maintain the necessary tension in the cables. The machine can be completely automatic by way of an automatic control system to cause the elongated bars to be fed.

7 Claims, 6 Drawing Figures

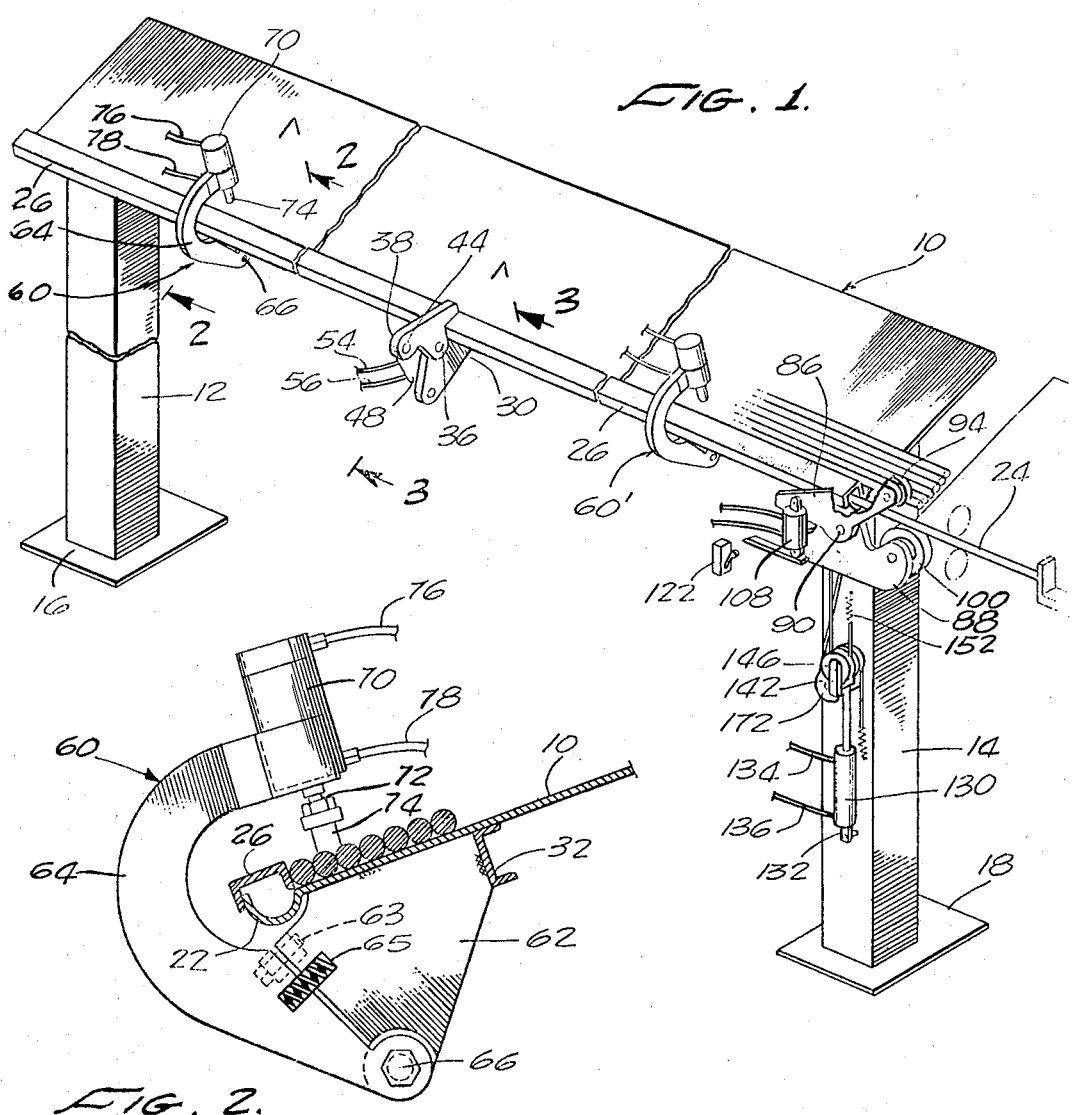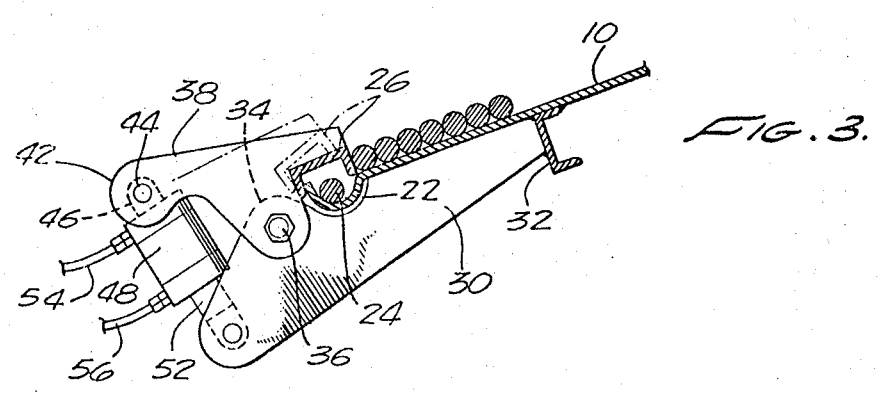

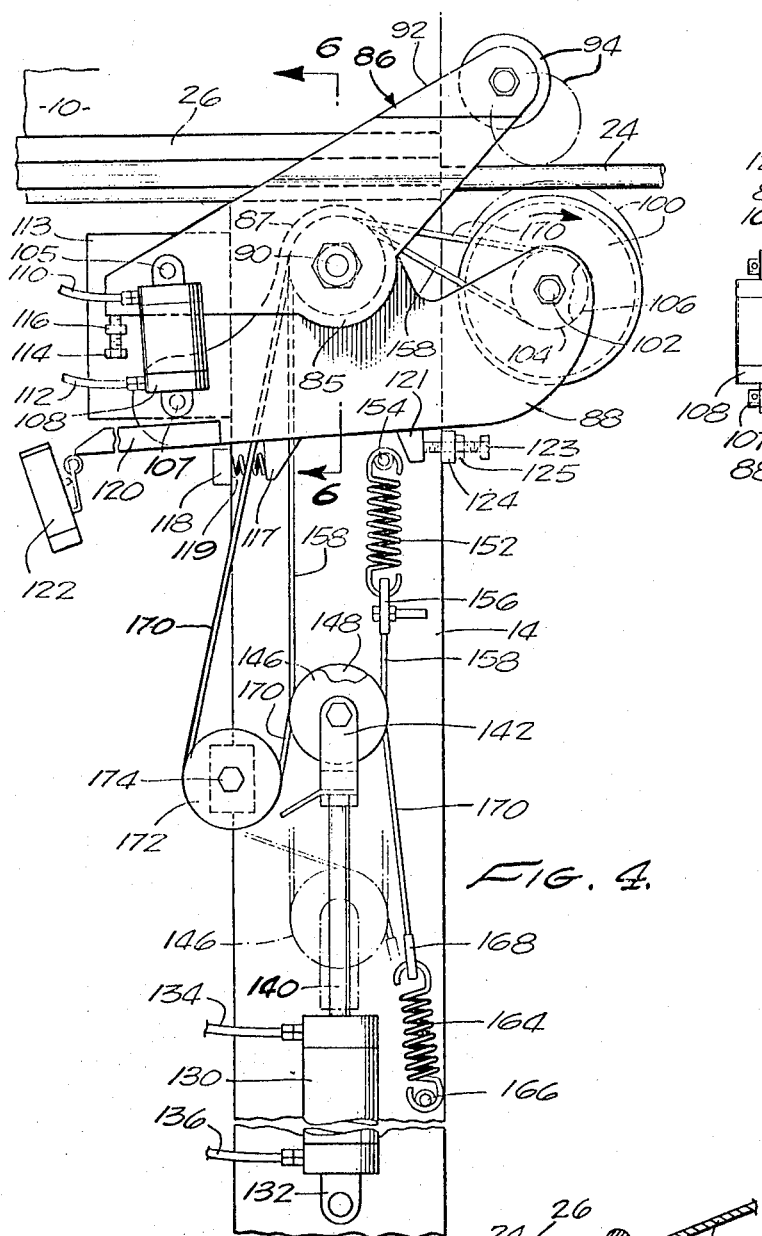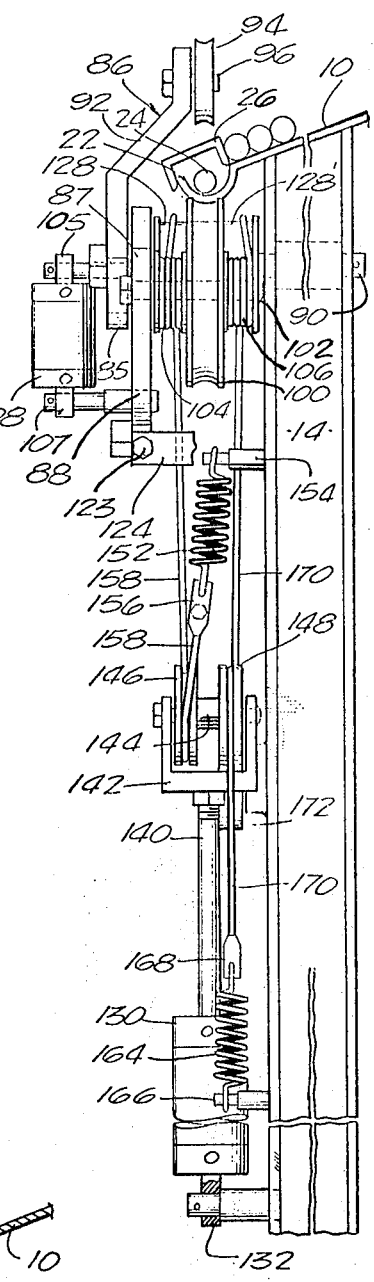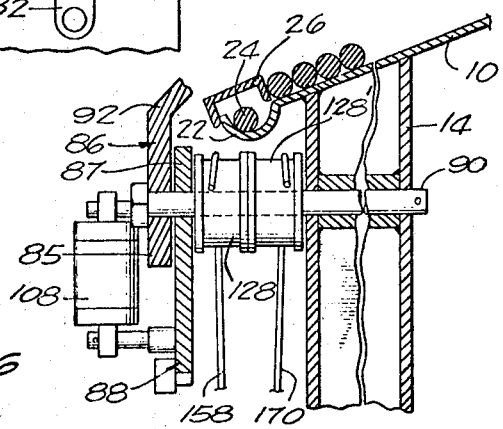

AUTOMATIC BAR LOADER OR FEEDER

SUMMARY OF THE INVENTION

The invention is a machine or apparatus for automatically deliverying, feeding, or loading elongated elements such as metal bars to an automatic machine which may be an automatic cutoff machine for cutting the bars into predetermined lengths. Automatic machines for performing such an operation are available and well known. It is possible to manually deliver, feed, or load the bars to the automatic machine from a supply on a platform or table. The primary object of the invention is to provide an automatic apparatus or machine which will perform the delivery or loading and thus eliminating the need to do this manually.

In a preferred form of the invention, the supply of bar elements to be delivered or loaded is on an inclined platform provided with means to position a bar to be loaded individually into a loading trough. Means are provided to grasp an individually positioned rod or bar and to drive it axially along its length to load it into the automatic cutoff machine. In the preferred, exemplary form of the invention, this means comprises a pair of grooved rollers arranged to move towards the individual bar to clamp it and to drive it along its length. One of the grooved pulleys or rollers are driven by cable means wound over pulleys with tensioning springs being provided to maintain the tension in the cable.

A further object of the invention resides in the realization of simplified and reliable means for clamping and driving or translating the bars, it being a particular objective to make it possible to have a single, unitary mechanism perform these functions.

A further object is to provide and realize simplified means for controlling the supply of bars on the platform and for releasing and positioning an individual bar into the feed or delivery trough.

A further object is to realize an apparatus wherein all functions may be performed by simple and reliable actuators, preferably in the form of hydraulic cylinders controlled by electrically actuated solenoid valves.

Another object is to realize a system readily adapting itself to complete automatic sequential electrical control by way of switch mechanisms actuatable by moving parts in the apparatus.

BRIEF DESCRIPTION OF THE DRAWINGS

Further objects and additional advantages of the invention will become apparent from the following detailed description and annexed drawings, wherein:

FIG. 1 is a partially schematic perspective view of the apparatus of the invention;

FIG. 2 is a sectional view taken along the line 2—2 of FIG. 1;

FIG. 3 is a detail sectional view taken along the line 3—3 of FIG. 1;

FIG. 4 is an enlarged elevational view of the clamping and drive mechanism for the bar elements;

FIG. 5 is an end view of the mechanism of FIG. 4; and

FIG. 6 is a sectional view taken along the line 6—6 of FIG. 4.

DESCRIPTION OF THE PREFERRED EMBODIMENT

In FIGS. 1, 2, and 3 of the drawings, the machine comprises a support platform or table 10 which carries or supports the elongated members to be delivered or loaded. As previously pointed out, these elongated members may be metal bars or rods. Support table or platform 10 is supported on an incline or slant as may be seen in FIGS. 2 and 3, the support being provided by columns or uprights 12 and 14 on flat base members 16 and 18.

The apparatus as shown in the figures feeds the bars to the right to an automatic machine of a conventional type which may be an automated machine for cutting the bars into predetermined lengths. This machine itself may be an automated machine with its operations automatically sequenced with those of the apparatus of this invention as referred to hereinafter.

At the lower edge of the table or platform 10, there is formed a trough 22 adapted to receive a single elongated bar member 24. This trough can be opened or closed by a hinged cover 26 of inverted channel shape as shown. Numeral 30 designates a bracket underneath the table 10 which extends from the channel member 32 which is underneath the table. This bracket is underneath the trough 22 as shown. It has an extending lug 34; and pivotally attached to this lug by a pivot bolt 36 is a lever member 38, the end of which is secured to the cover member 26. The other end of the lever member 38 as designated at 42 is pivotally attached by a pivot 44 to a lug 46 connected to a hydraulic cylinder 48 which may be a conventional type of actuator. The piston within the cylinder 48 is connected by stem 52 to the end part of bracket 30. Numeral 54 and 56 designate hydraulic lines to the hydraulic actuator cylinder 48. The supply of hydraulic fluid to and from the cylinder is controlled by an electrical solenoid valve or valves.

The bars to be loaded are fed by gravity down the incline of the table 10 into trough 22 which is covered and uncovered by hinged cover member 26. Means are provided to hold the bar members so that only one at a time is fed or delivered into the trough 22. Two holding devices are provided to hold the elongated bars. One of these devices is designated generally at 60 and is shown in more detail in FIG. 2. Numeral 62 designates a bracket of polygon shape positioned underneath table 10 and extending from U-channel 32. Numeral 64 designates an arcuate support arm which is pivoted to the bracket 62 by way of a pivot bolt 66. The support arm 64 and bracket 62 are attached together by a bolt 63 as shown in FIG. 2 with compression spring 65 between bracket 62 and arm 64 for a purpose to be described. Supported at the end of arm 64 is another hydraulic cylinder 70, the piston of which has a stem 72 at the end of which is a restraining or holding element 74 which can be projected against the elongated bars so as to hold them in position, as illustrated in FIG. 2. By adjusting bolt 63, arm 64 can be moved angularly to adjust the position of element 74 to a desired holding position. Numeral 76 and 78 designate hydraulic lines connected to the hydraulic actuator 70. These lines again are controlled by an electric solenoid valve or valves. The holding or restraining means 60' is like the device 60. Therefore, it need not be described in detail. The edge flange of cover 26 holds and releases one bar when the cover is swung around its hinge.

Means are provided to clamp a bar which has been fed into the trough 22 and drive it axially along its length to the automatic cutoff machine. This means is shown in FIG. 1 at the right end of table 10 and associated with the support column 14. This mechanism is shown more in detail in FIGS. 4, 5, and 6.

In the preferred form of the invention, the means for grasping or clamping the bar 24 to be delivered is a scissors mechanism having scissors or jaw mechanism designated at 86 and 88. These elements have a shape as shown, each having an extending lug part on the inside thereof as designated at 85 and 87. These lug parts are pivotally mounted on a pivot bolt 90 extending from column 14. Jaw element 86 has an offset part 92. Supported at its end is a grooved roller 94 adapted to engage with bar 24. Roller or pulley 94 is mounted on a pivot shaft 96. The jaw element 88 at its end supports a grooved pulley 100 on a shaft 102. This pulley has flanged hub parts on either side as designated at 104 and 106 adapted to receive or accommodate flexible cable or rope as will be described. The mechanism as just described is positioned so that end of bar 24 extending from trough 22 will lie between the grooved pulleys 94 and 100.

At the left end of element 86 is an extending pin 105; and at the left end of coil element 88 is an extending pin 107. Connected between these pins is a hydraulic cylinder 108. This piston is connected to one stem and the cylinder itself is connected to the other. Numeral 110 and 112 designate hydraulic lines connecting to cylinder or actuator 108. These lines are controlled by an electric solenoid valve or valves.

Column 14 has an extending part 113. Numeral 114 designates a screw extending through lug 116 on extension 113 forming a stop for jaw 86. Numeral 117 designates a lug on jaw 88. Numeral 118 designates a lug on column 14 with a coil spring 119 between the lugs. Numeral 121 designates another lug on jaw 88. Numeral 123 designates a stop screw extending through lug 124 on column 14. Numeral 125 designates a lock nut. A cylinder 108 operates the jaws. Jaw 86 is stopped by stop screw 114. Jaw 88 can move clockwise to open compressing spring 119. When cylinder 108 operates to close the jaws, spring 119 moves jaw 88 until lug 121 engages adjustable stop screw 123, thus, correctly positioning roller 100. Jaw 86 then moves roller 94 down onto the bar 124.

Numeral 124 designates a bracket on jaw 88 positioned to actuate microswitch 122.

As may be seen in FIG. 6, rotatable on the shaft 90 are two relatively wide flanged pulley members 128 and 128' adapted to have flexible cable or line wrapped thereon, as will be described. These pulleys are between the scissors mechanism and the upright or column 14 as shown.

The grasping or clamping and drive mechanism is operable by way of flexible lines or cables on which controlled tension is always maintained, as will now be described. Numeral 130 designates another hydraulic cylinder mounted on the column 14 by way of a bracket 132. Numerals 134 and 136 designate the hydraulic lines to cylinder actuator 130. These lines are controlled by an electric solenoid valve or valves. Cylinder 130 has a stem 140 at the end of which is a yoke 142. Between the legs of the yoke, there is provided a shaft 144. Mounted on this shaft are grooved pulleys 146 and 148.

In order to grasp or clamp a rod 24, the scissors mechanism is operated by hydraulic cylinder 108 to push the left end parts of elements 86 and 88 apart so that the grooved rollers 94 and 100 grasp or clamp rod 24. To then drive the rod to the right to the automatic cutoff machine, a pulley 100 is driven in a clockwise direction as indicated by the arrow in FIG. 4. The mechanism for driving pulley 100 will now be described.

Numeral 152 designates a coiled tension spring, one end of which is connected to a pin or stem 154 on column 14. The other end of the spring is connected by a fitting 156 which could be a turnbuckle to flexible line 158 which may be a rope or cable and which wraps over the grooved pulley 146, as shown. This cable then passes upwardly and over the pulley 128 as may be seen in FIG. 6. Then, it extends to the underside of flanged pulley 104 and is wrapped around that pulley in the position of the parts as shown in the figures. As may be observed, if the hydraulic cylinder 130 is operated to pull the stem 140 down, pulley 146 is moved downwardly to exert pull on the reaches of cable 158 against the force of spring 152 which maintains the tension. The pull on cable 158 passing over the pulley 128 extending to the pulley 104 causes it to be rotatably driven in a clockwise direction as indicated by the arrow in FIG. 4. Grooved pulley 100 is similarly rotated, and it drives bar 24 to the right, a predetermined amount as will be described.

Numeral 164 designates a second coil spring, one end of which is attached to stem 166 on column 14. The other end is attached to fitting 168 at the end of another flexible line or cable. This line or cable wraps around the grooved pulley 148. Numeral 172 designates another grooved pulley mounted on shaft 174 extending from the column 14. Cable 170 passes around grooved pulley 172 and extends to and passes around pulley 128' as may be seen in FIG. 6. This cable then extends to the pulley 106 as may be seen in FIG. 5 and wraps around that pulley from the top of it as shown.

From the foregoing, the operation will be readily understood. When the pulley 100 is being driven clockwise as described to drive bar 24 to the right, the cable is unwinding or coming off pulley 104 with tension being maintained by spring 152. At the same time, since pulley 148 is moving downwardly relative to pulley 172, cable 170 is being released so that this cable winds onto the pulley 106 which rotates along with pulley 100. Tension in this cable is being maintained by spring 164. Thus, it may be seen that when cable is being pulled off one pulley to produce rotation, the tension is being maintained by one tension spring. At the same time, there is release of the other cable which is wound up on the other drum or pulley while its tension is being maintained by a tension spring. When actuator 130 operates in the other direction, pulley 100 is driven in the other direction by pull exerted on cable 170, tension being maintained in the same way.

As previously pointed out, the machine into which the bars are delivered or fed may be an automated bar cutoff machine which cuts the bars into precision lengths. This machine has its own automatic controls, including relays and switches, and performs an automatic operation each time a bar is fed to it. The automated cutoff machine is provided with switch contacts which are actuated in response to passage of the end of the bar being fed by the herein described machine. This begins the sequence of operation of the loading machine in coordination with the cutoff machine in accordance with a sequence as follows.

SUMMARY OF OPERATION

Initially, the holding elements 74 are restraining all bars except the one lying against the hinged cover 26. The cutoff machine has in it switch contacts including one actuatable by a roller which senses the rear end of a bar in the cutoff machine. Actuation of these contacts causes the hinged cover 26 to operate to the open position. The bar which was held by the cover rolls by gravity down into the trough 22. The cutoff machine operates to cut the bar into relatively short lengths. Then, there may be a predetermined number of these lengths. The cutoff machine provides a further signal to close the hinged cover 26; to actuate the cylinder 108 causing closure of the jaws of the scissors by clamping a bar between rollers 94 and 100 and to release elements 74, permitting the bars to move down one diameter with the first bar against hinged cover 26.

The loading device remains in this condition until the bar is cut into lengths by the automatic cutoff machine. When the moment for loading a bar arrives, a signal comes from the cutoff machine which may be generated by a counter which starts counting and counts a predetermined number of sections of bar which have been cut. This causes cylinder 130 to operate rotating pulley 100 and thrusting the bar into the machine at the preset point. When cylinder 130 has travelled its full stroke, it actuates a microswitch and signals this fact. With this signal, scissors 86–88 opens releasing bar 24. As scissors 86–88 opens, switch 122 is pulsed signalling the automatic cutoff machine to begin its operation. Holding elements 74 return to their restraining position. The loading device remains in this condition awaiting the next loading bar demand.

From the foregoing, those skilled in the art will readily understand the nature of the construction of the invention, the manner in which it operates, and the manner in which it realizes all of the objectives and advantages as set forth in the foregoing.

The foregoing disclosure is representative of a preferred form of the invention, and is to be interpreted in an illustrative rather than a limiting sense, the invention to be accorded the full scope of the claims appended hereto.

What is claimed is:

1. A machine for automatically loading or feeding elongated bar elements comprising in combination: means supporting a plurality of elongated bars; means whereby to position an individual bar element for loading; means for grasping an individual bar element and moving it axially along its length; said last means comprising driving pulley roller means for clamping a bar element, said roller means comprising a driven pulley roller for driving the bar element axially along its length; said driving means comprising a driving pulley roller having cable wrapped around it, means for exerting tension on said cable for said driving pulley roller; and said cable means having an end part, a tension spring having said end part of the cable connected to it, whereby tension is maintained in the cable during movement of the driven pulley roller.

2. A machine as in claim 1, said supporting means being constructed to feed bar elements by gravity, trough means to receive bar elements, and means for holding the bar elements operable to cause the bar members to be delivered individually to said trough means.

3. A machine as in claim 2, including means positionable to hold an elongated bar and to move to release said bar to drop in said trough, and means for holding remaining bar members other than said one individual bar member.

4. Apparatus as in claim 1, wherein said driving means comprises a movable pulley having a bight of said cable wrapped around it and means for moving said pulley whereby to exert a driving pull on said cable.

5. A machine for automatically loading or feeding elongated bar elements comprising in combination: means supporting a plurality of elongated bars; means whereby to position an individual bar element for loading; means for grasping an individual bar element and moving it axially along its length; said last means comprising pulley roller means for clamping a bar element, said roller means comprising a driven pulley roller for clamping a bar element; said roller means comprising a driven pulley roller for driving the bar element, means for driving said driven pulley roller for driving the bar element axially along its length, said driving means comprising a driving pulley roller having cable wrapped around it, means for exerting tension on said cable for driving said driving pulley roller; and a second pulley means having a cable wrapped on it which unwinds when the driven pulley roller is operated in a driving direction and takeup means to take up said cable when unwound from the pulley roller.

6. A machine for automatically loading or feeding elongated bar elements comprising in combination; means supporting a plurality of elongated bars; means whereby to position an individual bar element for loading; means for grasping an individual bar element and moving it axially along its length; said last means comprising pulley roller means for clamping a bar element, said roller means comprising a driven pulley roller for driving the bar element; means for driving said driven pulley roller for driving the bar element axially along its length; said driving means comprising a moveable pulley having a bight of said cable wrapped around it; means for moving said pulley whereby to exert a driving pull on said cable; and a second driving pulley roller having cable wrapped around it for driving in the opposite direction.

7. Apparatus as in claim 6, including a tension spring for maintaining tension on cable wrapped on said second driving pulley roller.

* * * * *